United States Patent [19]

Soden et al.

[11] Patent Number: 4,916,287
[45] Date of Patent: Apr. 10, 1990

[54] INSTANT HEATING SYSTEM FOR MOTOR VEHICLES AND THE LIKE

[76] Inventors: George Soden, 3731 Oceanic Ave., Sea Gate, Brooklyn, N.Y. 11224; Howard J. Lettine, Rd. 4-Box 583, Middletown, N.Y. 10940

[21] Appl. No.: 278,767

[22] Filed: Dec. 2, 1988

[51] Int. Cl.⁴ .......................... H05B 1/02; F24H 3/04
[52] U.S. Cl. ..................... 219/202; 219/368; 219/370; 219/492
[58] Field of Search ............... 219/364, 202, 366, 368, 219/369, 370, 492, 483, 493

[56] References Cited

U.S. PATENT DOCUMENTS

| | | | |
|---|---|---|---|
| 1,979,222 | 10/1934 | Goodwin | 219/433 |
| 1,996,972 | 4/1935 | Parsons | 219/370 |
| 2,078,548 | 4/1937 | Strawser | 219/370 |
| 2,552,470 | 5/1951 | Wahlberg | 219/366 |
| 2,819,373 | 1/1958 | Allman | 219/364 |
| 4,170,729 | 10/1979 | Lane et al. | 219/364 |
| 4,293,759 | 10/1981 | Higgins | 219/364 |
| 4,295,052 | 10/1981 | Jochmann et al. | 219/202 |
| 4,302,663 | 11/1981 | Chesnut et al. | 219/369 |

FOREIGN PATENT DOCUMENTS 1385308 11/1964 France .................. 219/370

Primary Examiner—A. D. Pellinen
Assistant Examiner—Geoffrey S. Evans
Attorney, Agent, or Firm—Richard L. Miller

[57] ABSTRACT

An electrically powered heater for instantly heating the interior of motor vehicles and the like uses DC current to actuate a plurality of heating coils located in an under-dash mounted casing. The casing has an air flow passage therein and a motor driven fan arranged to draw ambient air through apertures in the rear of the casing, over the heated coils and back into the vehicle interior through the front of the casing. Each heating coil is connected either singly or in pairs with a manually operated toggle switch so that each coil may be turned on separately or all coils together to adjust the heat and power consumption levels. The fan is separately switched and may be operated independently of the coils. An electronic control circuit for the heater includes an on-off switch and a manually adjustable time delay network which automatically turns off the heating coils after a preselected time.

10 Claims, 2 Drawing Sheets

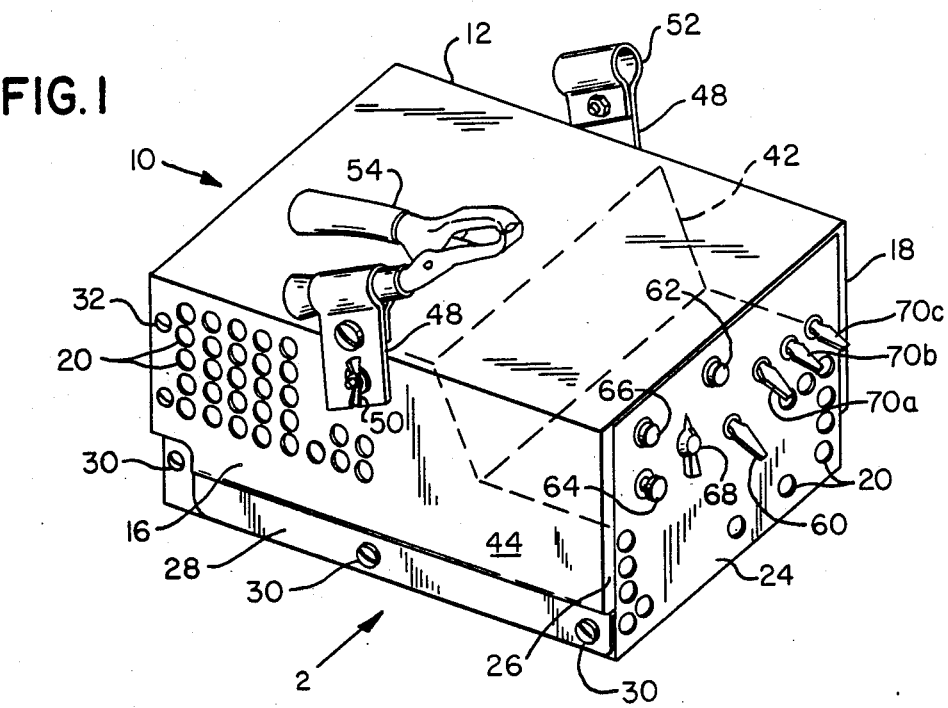
FIG. 1
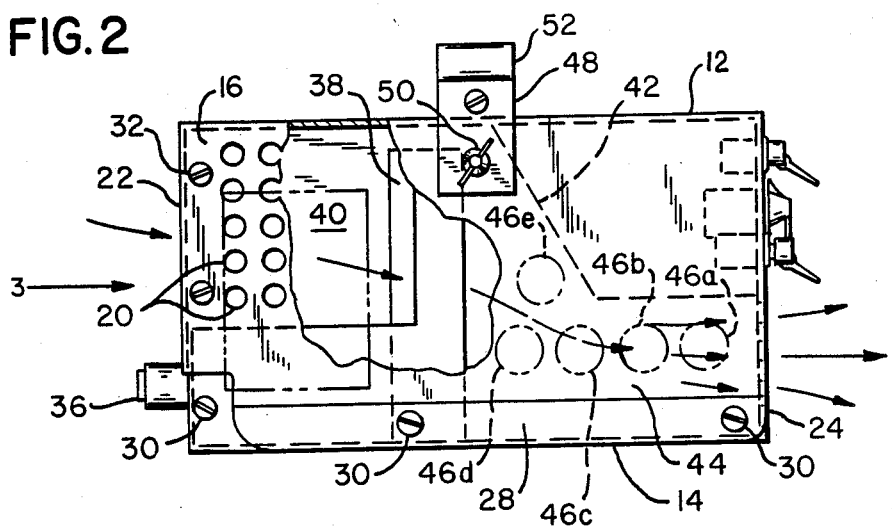
FIG. 2
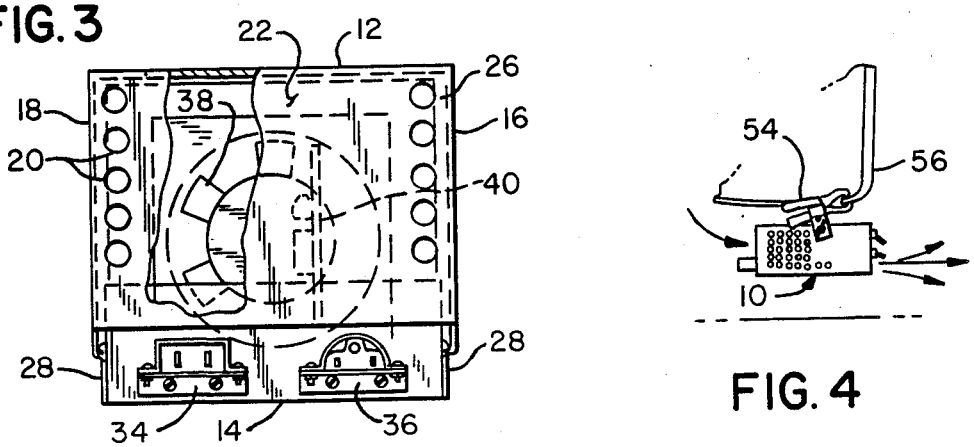
FIG. 3
FIG. 4

INSTANT HEATING SYSTEM FOR MOTOR VEHICLES AND THE LIKE

BACKGROUND OF THE INVENTION

1. Field of the Invention

This invention is an instant electrically powered heating system for providing a rapid warm-up to the passenger compartment of a motor vehicle or the like. The heating level may be adjusted and the heating coils are automatically turned off after a manually adjustable time period.

2. Description of the Prior Art

In conventional heaters for motor vehicles, ambient and/or outside air is passed through a heat exchanger and forced into the passenger compartment by a fan through one or more vents generally located in or near the wall separating the passenger compartment from the engine. The heat exchanger also receives fluid from the engine which does not become warm for a significant time after the engine is started, especially in cold weather. Even when the heater begins to pass warmed air, this air does not directly warm the driver, generally because of the location of the heating vents.

Conventional prior art attempts to provide rapid heating to the passenger compartment of the vehicle when the engine is not operating, or prior to warm-up of a cold engine, generally use bulky and often expensive heaters which are also noisy and can drain considerable energy from the vehicle battery, and are thus limited in utility. Furthermore, since heat from the conventional heater is slow in starting, the driver when entering a motor vehicle in cold weather encounters a cold environment, and is uncomfortable until after the engine warms and provides sufficient warm air to the passenger compartment. This situation is unsafe, and could be the cause of accidents. A fast acting heater which is electrically powered, which may be mounted wherever desired and which may be positioned to supply warm air immediately to the driver would be a desirable addition to a motor vehicle.

Some prior art auxiliary electrically powered heaters attempt to overcome the power drain problem by using the three phase AC voltage from the vehicle alternator, but such units are generally complex and expensive. Others attempt to prevent excessive power drain and/or burn-out of the auxiliary heater by using complex or expensive heat or current sensing devices to turn off the auxiliary heater when the vehicle heat supply is sufficient. Representative prior art is shown in U.S. Pat. Nos. 3,313,915; 4,004,126; 4,034,204; 4,188,527; 4,232,211 and 4,562,957.

The present invention avoids the disadvantages of the prior art by providing a small, inexpensive auxiliary electrically powered instant heating system constructed from standard components. The unit may be mounted under the dashboard to supply heat where it is most needed. The heat and power levels are variable, and the electrical power to the heating coils is automatically turned off after a manually adjustable time delay.

SUMMARY OF THE INVENTION

It is an object of the present invention to provide an improved instant heating system for motor vehicles and the like.

A further object of this invention is an improved instant heating system for motor vehicles which is compact and inexpensive, and which may be mounted conveniently under the dashboard so as to provide heat to the desired portion of the vehicle.

Another object of this invention is an improved instant heating system for motor vehicles in which the amount of heat provided, or the power drain of the unit, may be adjusted by a plurality of conveniently positioned manual switches each of which is connected with a separate heating coil or coils and which connect or disconnect the coil or coils from the heating system.

A still further object of this invention is an improved instant heating system for motor vehicles wherein an electronic timer may be set via a manually adjustable dial to provide a preselected time when the heating coils are turned off after initiation of the unit.

In accordance with the present invention, there is provided a casing which may be mounted conveniently under the dashboard of the vehicle. The casing contains an airflow passage therein and a fan located in the airflow passage for pulling ambient air into the air flow passage through the casing, passing it over one or more electrically energized heating coils, and back into the vehicle through the casing. Each heating coil or a pair of coils is separately connected to the power source via a manually operable toggle switch, and an electrical circuit automatically turns off all the heating coils after a manually adjustable time delay. A separate switch is provided for energizing the fan without turning on the heating coils. A separate on-off switch initiates the unit, and separate indicator lights are turned on when the blower is energized and when the heating coils are on.

Other objects and advantages of the present invention will become apparent by reference to the following descriptions of the preferred embodiments thereof when read with reference to the accompanying drawings in which like reference characters refer to the like elements throughout the views.

BRIEF DESCRIPTION OF THE DRAWINGS

FIG. 1 is a diagrammatic perspective view if the present invention;

FIG. 2 is a diagrammatic side elevational view taken in the direction of arrow 2 in FIG. 1;

FIG. 3 is a diagrammatic rear elevational view taken in the direction of arrow 3 in FIG. 2;

FIG. 4 is a fragmentary diagrammatic view illustrating how the present invention may be mounted under a dashboard of a motor vehicle.

DETAILED DESCRIPTION OF THE PREFERRED EMBODIMENTS

Figure 5:
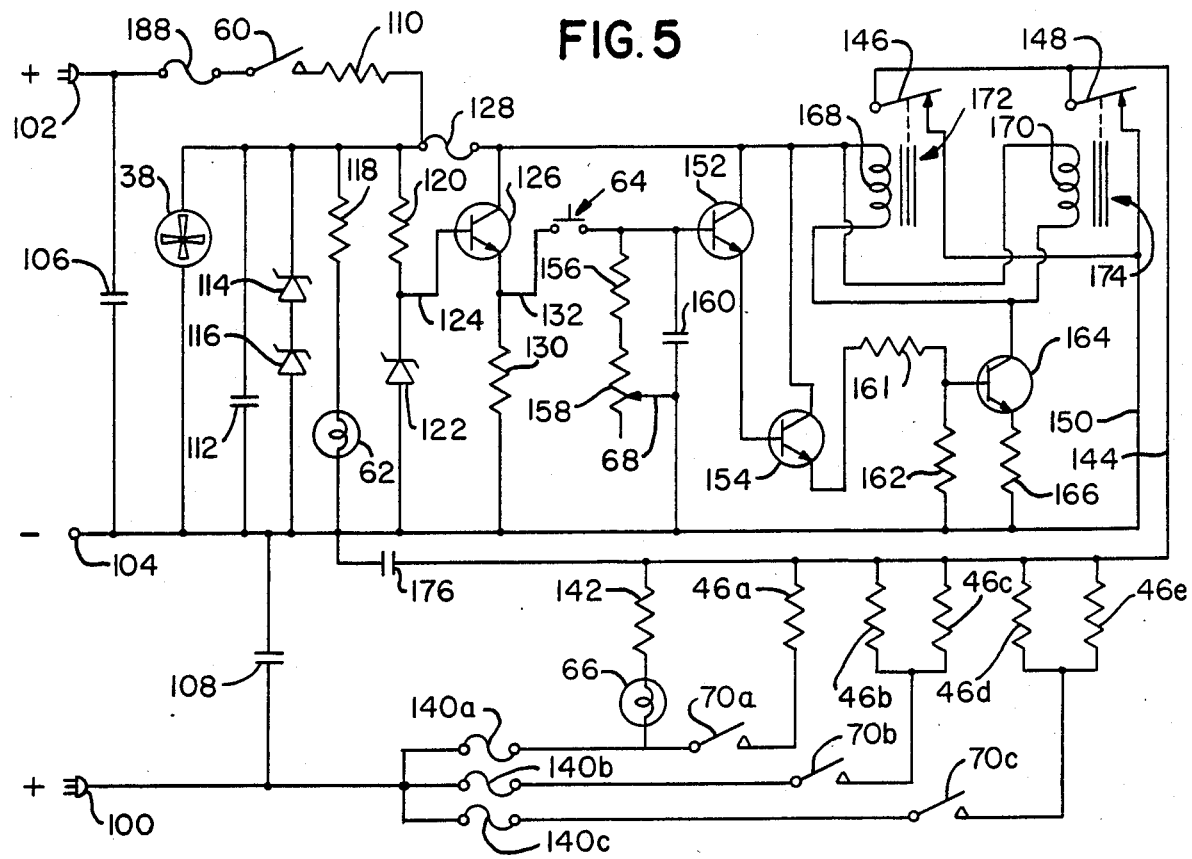
FIG. 5 is a schematic diagram of the electronic circuitry of the present invention.

Referring particularly to FIGS. 1–3, the heater of this invention comprises a casing 10 generally rectangular in shape and constructed preferably from metal and/or high temperature plastic. Top and bottom panels 12 and 14 are solid, while side panels 16 and 18 contain a plurality of apertures 20 at the rearward end of the side panels. Rear wall 22 and front wall 24 also contain apertures 20, but the apertures are only in the bottom portion of front wall 24 for reasons which will be evident. Preferably the top panel 12 and side panels 16 and 18 are constructed in one piece, while bottom panel 14 and front and rear walls 24 and 22 are also in one piece, side panels 16 and 18 having flanges 26 which extend inwardly and overlap the front and rear walls, and bottom panel 14 has a flange 28 on each side thereof which overlaps the bottom most portion of side panels 16 and 18, and which may be secured thereto by screws 30. Rear wall 22 may also contain an inwardly extending flange, not shown, through which additional screws 32 may be secured. Details of construction and assembly of the casing 10 may be modified, and such changes will be apparent to those skilled in the art.

Fixedly attached through the rear wall 22 are two electrical connectors 34 and 36, connector 34 being a two-prong plug receptacle and connector 36 being a three-prong plug receptacle. Two independent connectors are desirable for ease of connection of the heater to electrical extension cords or the like to provide the DC electrical voltage to the heater. Commonly available hardware is used with redundancy. Internally to the heater, like electrical terminals of both connectors 34 and 36 may be electrically connected together to provide a single voltage input regardless of which of the two connectors is used. The reason for having the connectors separate is to connect connector 34 to a control circuit after the car key switch is turned on, if desired, to prevent unintentional operation. Appropriate grounding of the connectors is also necessary.

It is contemplated that the source of DC electrical voltage supplied to the heater will be from a connection to the vehicle battery, but power may be provided from a generator or alternator, or an auxiliary power supply. If filtering or rectification is needed, it may be performed either external to the heater, or a rectifier may be built internal to the heater, although the latter would add unnecessary expense.

Mounted within the casing 10 is an electric fan 38 shown in FIGS. 2 and 3, the fan being fixed within the casing 10 by a bracket or other mounting means, not shown, and electrically connected to the DC voltage source as will be described in conjunction with FIG. 5. The electronics shown in FIG. 5, with the exception of the heating coils, is preferably mounted on a heat resistant circuit board 40, and physically connected within the casing by any convenient support bracket or the like as shown in FIGS. 2 and 3. The electrical wiring inside the casing 10 joining the electrical input connectors, the circuit board 40, the fan 38 and the heating coils to be described subsequently are not shown since such connections are obvious.

An air flow guide 42 shown in phantom in FIGS. 1 and 2, and generally constructed from metal or plastic, is fixedly attached within casing 10 by brackets or other securing means. The purpose of air flow guide 42 is to direct the ambient air, which enters the casing 10 through the apertures 20 in rear wall 22 in side walls 16 and 18 and which thereafter passes through fan 38, through the reduced diameter portion of the chamber shown as 44 in FIGS. 1 and 2. The five heating coils 46a, 46b, 46c, 46d and 46e are also located in chamber portion 44. The fan discharge air is thus heated and then discharged through the apertures 20 in front wall 24 into the passenger compartment. The air flow guide 42 thus directs the air over the heating coils 46, but also reduces the cross sectional area of the airflow passage which increases the air velocity as it exits the heater.

The heater casing 10 is adapted for mounting conveniently inside a motor vehicle, such as under the dashboard of an automobile, as best shown in FIGS. 1 and 4. A pair of upwardly extending mounting brackets 48 are attached to the side panels 16 and 18 by screws and wing nuts 50 which enable the brackets 48 to be vertically rotated. The top of each bracket comprises an expandable circular clamp 52 which is adapted to hold a spring loaded grip-type clamp 54 which may be attached to the lower edge of the vehicle dashboard 56 as best seen in FIG. 4. Other attaching means may also be used.

Located on the front wall 24 near the top thereof and away from the warm air exiting through the bottom of the wall are an on-off switch 60 which controls the fan 38, and a green light 62 which is turned on when the fan 38 is operating. A push button switch 64 provides power to the coils 46 when actuated, and a red light 66 is turned on when power is being supplied to the heating coils 46. A rotary timer control 68, which is preferably a rheostat, adjusts a time delay circuit shown in FIG. 5 to determine the time during which electrical power is supplied to heating coils 46, after which the power to the heating coils is terminated and the coils are automatically turned off. Toggle switches 70a, 70b and 70c each control the supply of power to one of the heating coils, or to a pair of coils, and thus there is a mechanism for determining the heating level of the heater, as well as the amount of electrical power consumed by the heater.

Referring to FIG. 5, the preferred arrangement of electronics controls for the heater is shown. For clarity of circuit description the source of positive voltage is shown at terminals 100 and 102, although it will be evident that the two terminals are not separate. The negative terminal is shown at 104. In most motor vehicles the negative terminal is common, and the positive terminal is at +12 volts. Filtering capacitors 106 and 108 are used to smooth any voltage transients.

Fan 38 is connected to the line voltage via a 5 amp. fuse 188, via switch 60 and via resistor 110. Connected across fan 38 is a capacitor 112 and a pair of series connected Zener diodes 114 and 116 which prevent voltage spikes above 24 volts. A resistor 118 and lamp 62 are connected across fan 38 so that lamp 62, preferably green, will be turned on when the fan 38 is energized.

Also connected across fan 38 is a resistor 120 and a reverse biased Zener diode 122, with the junction between resistor 120 and Zener diode 122 being connected via line 124 to the base junction of NPN transistor 126. The collector junction of the transistor is connected to the positive voltage supply through fuse 128 which is preferably a 10 ampere time delay type thermal fuse, which will disconnect the power from the circuit transistors only after a malfunction occurs, but which will not respond to short transient overloads. Connected between the emitter of transistor 126 and the negative voltage terminal is resistor 130. The junction between transistor 126 and resistor 130 is connected via line 132 to one side of push button switch 64.

Upon the closing of switch 60, fan 38 and lamp 62 are turned on. The voltage at line 124 to the base junction of transistor 126 is maintained at a sufficiently high positive level to cause transistor 126 to conduct and raise the voltage on line 132. However, until switch 64 is actuated or pushed, no current will flow to the heating coils 46, and fan 38 will pass only ambient air. It will also be noted that the fan 38 must be actuated by the closing of switch 60 before switch 64 is actuated or no current will flow through the heating coils 46.

Positive terminal 100 is connected to the heating coils 46 and will produce current flow through the selected coils, i.e., those coils selected by switches 70a, 70b and/or 70c, upon the actuation of switch 64. Heating coil 46a is connected to terminal 100 through switch 70a and 15 amp. fuse 140a. Heating coils 46b and 46c are connected in parallel, and in series with switch 70b and a 25 amp. fuse 140b. Heating coils 46d and 46e are also connected in parallel and in series with switch 70c and a 25 amp. fuse 140c. Connected across coil 46a is lamp 66 and resistor 142, the lamp being turned on when current flows through any of the heating coil 46a, 46b, 46c, 46d and 46e.

All heating coils 46a, 46b, 46c, 46d and 46e are connected to conductor 144 which will be connected to the negative potential on conductor 150 through normally open relay contacts 146 and 148. Contacts 146 and 148 will remain open until switch 64 is actuated, so that no current path is available through any of the heating coils even though any or all of the switches 140a, 140b and 140c are closed. However, upon the actuation of switch 64, the voltage in line 132 is immediately applied to the base junction of transistor 152 causingg it to conduct. The collector of transistor 152 is connected to the positive terminal 102, and the emitter is connected to the base of transistor 154. Connected between the base junction of transistor 152 and negative terminal 104 is an R-C time delay circuit comprising resistor 156 and rheostat 158, the resistance of the rheostat being varied by rotatable switch 68. Capacitor 160 is connected across resistor 156 and rheostat 158, and the values of resistance and capacitance are chosen such that capacitor 160 charges rapidly upon the actuation of switch 64. Since switch 64 is of the push button type, it will be closed for only a brief time. When the switch 64 re-opens, capacitor 160 maintains the base-emitter junction of transistor 152 at a current level sufficient to keep the transistor conducting, but gradually the charge on the capacitor is dissipated through the resistors 156 and 158 and the conducting transistor 152, and the current through the base-emitter junction of transistor 152 reduces to the point where transistor 152 no longer conducts. The time constant of the circuit is adjusted by rotatable switch 68 which changes the resistance of the rheostat 158. The values are selected to vary the time constant from between 1 and 5 minutes.

When transistor 152 conducts, it turns on transistor 154, and the current flow from transistor 154 creates a voltage at the junction between resistors 161 and 162 sufficient to turn on transistor 164, connected to negative terminal 104 through resistor 166, and connected to positive terminal 102 through coils 168 and 170 of relays 172 and 174. Upon conduction of transistor 164 current flows through coils 168 and 170, energizing relays 172 and 174 and closing contacts 146 and 148. A current path is thus created from positive terminal 100 through any of the switches 70a, 70b and 70c which are closed, through the heating coils connected to the closed switches 70a, 70b and 70c, through conductor 144, contacts 146 and 148, and conductor 150 back to negative terminal 104. When transistor 152 turns off after the selected time delay, transistor 164 is turned off preventing current flow through coils 168 and 170, contacts 146 and 148 are opened, and current no longer passes through any of the heating coils 46a, 46b, 46c, 46d and 46e. A capacitor 176 is used to prevent arcing at the relay contacts.

Representative values of the circuit components are:

| Resistors | | Capacitors | |
|---|---|---|---|
| 110 | ¼ ohm | 106 | .1 microfarads |

-continued

| Resistors | | Capacitors | |
|---|---|---|---|
| 118 | 100 ohms | 108 | .1 microfarads |
| 120 | 1k ohms | 112 | 4700 microfarads |
| 130 | 1k ohms | 160 | 4700 microfarads |
| 142 | 100 ohms | 170 | .1 microfarads |
| 156 | 22k ohms | | |
| 158 | 100k ohms | | |
| 161 | 1k ohms | | |
| 162 | 1k ohms | | |
| 166 | ¼ ohm | | |

It is apparent that changes and modifications may be made to the construction and arrangement of the invention without departing from its scope as hereinafter claimed.

What is claimed is:

1. A heater for the interior of motor vehicles and the like operable from a source of DC electrical power comprising:
    (a) a casing having an electric fan positioned in an airflow passage therein, said passage including a first multi-apertured wall in the rear of said casing upstream from said fan through which ambient air is drawn, and including a second multi-apertured wall in the front of said casing downstream from said fan through which air is discharged;
    (b) airflow guide means located within the airflow passage in said casing downstream from said fan for guiding said air from said fan to said second wall;
    (c) fan switch means connecting said electric fan to said DC electrical power source whereby said fan may be actuated by operating said fan switch means;
    (d) a plurality of electrically powered heating coils located within said airflow passage downstream from said fan, each of said heating coils including a manually operable heater switch connected herewith for providing an electrical current path through each selected heating coil independently of the other coils upon operation of its associated heater switch;
    (e) a power switch for said heating coils operable to connect said DC electrical power source to the selected ones of said heating coils only when said electric fan is actuated; and
    (f) manually adjustable time delay means including a time adjustment control operable in response to operation of said power switch for automatically disconnecting said source of DC power from said heating coils upon expiration of the time selected by said time adjustment control.

2. A heater as in claim 1 in which at least one of said heating coils includes first and second resistive elements connected in parallel.

3. A heater as in claim 1 in which said casing is rectangular, and said airflow guide means includes an obstructing wall located completely across an inside wall of said casing laterally to said airflow, said obstructing wall extending from said inside wall substantially to the center of said casing for guiding said air to an aperture formed between the furthermost extension of said obstructing wall from said inside wall and the wall opposite said inside wall.

4. A heater as in claim 1 in which said adjustable time delay means includes:
    (a) a first transistor operable in response to actuation of said power switch;

(b) a capacitor adapted to be charged in response to actuation of said power switch for maintaining operation of said first transistor for a time after actuation of said power switch; and (c) adjustable resistor means connected with said capacitor and adjusted in response to said time adjustment switch for varying the rate of discharge of said capacitor whereby said first transistor is disabled when said capacitor is discharged.

5. A heater as in claim 4 in which said adjustable resistor means includes a rheostat responsive to actuation of said time adjustment switch for varying the resistance of said rheostat.

6. A heater as in claim 1 and further including first and second relays;

normally open first and second switch means connected respectively to each of said relays, each of said first and second switch means being connected in series between said heating coils and said DC power source; and (c) means responsive to actuation of said power switch for actuating said first and second relays to close said first and second switch means and provide a current path through the selected ones of said heating coils.

7. A heater as in claim 1 and including a first lamp operable upon closing of said fan switch means to indicate operation of said electric fan; and said second lamp operable upon closing of said power switch for indicating the flow of current through said selected heating coils.

8. A heater as in claim 7 in which said first and second lamps, said fan switch, said power switch, said time switch and said plurality of power switches are mounted on the front of said casing.

9. A heater as in claim 7 and including means connected with said casing for adjustably mounting said casing to the dashboard of a motor vehicle.

10. A heater as in claim 1 and including power receptacle means mounted in the rear of said casing for connecting said heater with a source of DC power.

* * * * *